United States Patent [19]

Pulizzi et al.

[11] Patent Number: 5,450,334
[45] Date of Patent: Sep. 12, 1995

[54] ONE TIME PROGRAMMABLE SWITCHED-OUTPUT CONTROLLER

[75] Inventors: Peter S. Pulizzi, Fountain Valley; Marshall D. Rester, Santa Ana, both of Calif.

[73] Assignee: Pulizzi Engineering, Inc., Santa Ana, Calif.

[21] Appl. No.: 146,796

[22] Filed: Nov. 1, 1993

[51] Int. Cl.⁶ .................................................. H02J 11/00
[52] U.S. Cl. .................................. 364/492; 307/38; 307/40; 307/41; 307/112; 364/141
[58] Field of Search .................... 307/38, 40, 41, 112; 364/141, 492

[56] References Cited

U.S. PATENT DOCUMENTS

| | | |
|---|---|---|
| 3,050,713 | 8/1962 | Harmon . |
| 4,016,474 | 4/1977 | Mason ................................. 320/14 |
| 4,051,326 | 9/1977 | Badagnani et al. ............... 179/20 P |
| 4,177,388 | 12/1979 | Lingenfelter ...................... 307/38 |
| 4,215,277 | 7/1980 | Weiner et al. ..................... 307/41 |
| 4,270,573 | 6/1981 | Sturman et al. ................. 137/624.2 |
| 4,400,694 | 8/1983 | Glasmacher .................... 340/825.22 |
| 4,418,333 | 11/1983 | Schwarzbach et al. ......... 364/139 X |
| 4,419,590 | 12/1983 | Voss ..................................... 307/41 |
| 4,548,637 | 10/1985 | Miller ............................. 364/476 X |
| 4,647,721 | 3/1987 | Busam et al. ...................... 379/102 |
| 4,656,318 | 4/1987 | Noyes .................................. 379/93 |
| 4,674,031 | 6/1987 | Siska, Jr. ........................... 364/184 |
| 4,697,231 | 9/1987 | Boytor et al. ................... 364/146 X |
| 4,701,946 | 10/1987 | Oliva et al. ......................... 379/98 |
| 4,719,364 | 1/1988 | Pequet et al. ..................... 307/141 |
| 4,723,269 | 2/1988 | Summerlin ....................... 379/102 |
| 4,769,555 | 9/1988 | Pequet et al. ..................... 307/141 |
| 4,815,031 | 3/1989 | Furukawa ......................... 364/900 |
| 4,907,254 | 3/1990 | Suzuki et al. ....................... 379/93 |
| 4,918,562 | 4/1990 | Pulizzi et al. ....................... 361/86 |
| 4,922,450 | 5/1990 | Rose et al. ........................ 364/900 |
| 4,965,828 | 10/1990 | Ergott, Jr. et al. .............. 371/14 X |
| 5,003,578 | 3/1991 | Lin ..................................... 379/90 |
| 5,012,233 | 4/1991 | Poulsen, Jr. ................... 340/825.18 |
| 5,324,989 | 6/1994 | Thornton ............................ 307/35 |
| 5,340,964 | 8/1994 | Galloway et al. ................ 307/41 X |
| 5,374,854 | 12/1994 | Chen ................................ 307/117 |

OTHER PUBLICATIONS

"Embeddet Control Handbook" (e.g., Chapter 2, pp. 2–21 et seq.) Microchip Technology Inc, Oct. 1992.
"M68HC05 Applications Guide" Motorola Inc., 1989. (General).
"ST6210/ST6215, ST6220/ST6225 Handbook" 2nd Ed. SGS-Thompson Microelectronics, Oct. 1992.

*Primary Examiner*—Edward R. Cosimano
*Attorney, Agent, or Firm*—Howard R. Lambert

[57] ABSTRACT

A one time programmable (OTP) electronic switched-output controller apparatus comprises a plurality of switched-output relays which may be power relays, signal voltage relays, dry switching relays or any combination thereof. A power section receives AC line power and provides at least one internal operating DC voltage and provides line AC power to any power relays and to the related power outputs when the relay are actuated. An A-D converter provides DC voltage for internal operation and to any DC voltage relays. A one time programmable microcontroller, which has outputs connected to the relay coils, is programmed before installation in the switched-output controller apparatus to cause actuation of the relay coils in accordance with a preestablished operating protocol. The apparatus is shown connected for receiving RS232 signals and has an internal modem for receiving external signals over a telephone line. A relay enables switching between the RS232 and modem inputs. Provision is also made to receive other external signals, for example, from temperature or pressure sensing devices. A corresponding method of manufacturing the OTP switched-output controller apparatus is disclosed.

20 Claims, 4 Drawing Sheets

_Fig. 3._

_Fig. 4._

ONE TIME PROGRAMMABLE SWITCHED-OUTPUT CONTROLLER

BACKGROUND OF THE INVENTION

1. Field of the Invention

The present invention relates generally to the field of electronic apparatus, more particularly to the field of electronic switched-output controller apparatus, and still more particularly to electronic, multiple switched-output, such as switched-power or switched-signal, controller apparatus.

2. Background Discussion

With the ever-increasing use in business and government of computers and computer work stations, and related equipment such as monitors, disc drives and printers, there is a corresponding increased need for electronic equipment to control the operation thereof. For example, power controllers are frequently used to power-up and power-down such electronic apparatus, or switched-output control apparatus may be used for providing low-voltage or signal inputs to electronic apparatus requiring such inputs for operation.

As an example of switched power needs, when a number of current-drawing electronic apparatus, such as computers, disc drives and printers, are connected to a common building electrical outlet, turning on all the apparatus at the same time can result in a combined high start-up current spike. Such a turn-on power spike may be sufficiently high to trip the circuit breaker associated with the building electrical outlet supplying power to the apparatus, even though the combined steady-state current requirements of all the apparatus are within the current capacity of the circuit. Without time-delay sequencing of the turning on of the equipment, there is needed either a higher current capacity building circuit or more than one building outlet circuit—neither of which may be available or practical to provide in already-constructed offices or buildings. An appropriately configured, switched power controller which provides time-delay turn-ons for the various pieces of electronic equipment, so that they do not all turn on at the same instant, can typically remedy this problem of high cumulative start-up current spikes without requiring special or multiple building circuits.

On the other hand, even if the available building circuit capacity is capable of handling high start-up current spikes caused by the simultaneous turning on of a number of pieces of electrical or electronic equipment, it may be required or desired to turn on certain pieces of the equipment before others are turned on. For example, it may be required to turn on a stand-alone disc drive so that it is "up and running" before the associated computer is turned on. Similar delayed turn-off of several pieces of some electronic or electrical equipment may be needed.

Other situations requiring the controlled turning on and off of electrical power or operating signals to electronic or electrical equipment are unattended installations of such equipment or location of such equipment in remote or relatively-inaccessible places. It may, for example, be desired to turn off unattended computers or computer systems whenever they are not used for a predetermined length of time and to turn them back on when they are addressed. It may also be desired to turn off certain unattended or remote electronic equipment, such as computers, fans, or pumps, when monitored ambient conditions, such as temperature, pressure and/or humidity exceed or fall below predetermined limits and to turn the equipment back on when the ambient conditions return to acceptable values.

By way of a still further example, it may be necessary, for equipment protection, to turn off certain pieces of equipment when the available line voltage exceeds or falls below safe equipment operating limits and to turn the equipment back on when the line voltage returns to a safe operating level for a preestablished period of time.

Thus, present requirements for switching controls to turn on and off electrical and electronic equipment and/or to provide switching signals to electronic apparatus are virtually limitless. However, these requirements tend to be highly individualized since many electrical or electronic equipment installations are customized to meet individual user requirements.

Multiple time delay power controllers such as are, for example, disclosed in U.S. Pat. No. 4,769,555 to Pequet, et al., are useful for switched power controlling situations. However, they and other switched output controllers tend to be uneconomical when only one or a few of the switched-output controllers of a particular configuration are required by customers. The principal reason for this is because such switched-output controllers have heretofore, so far as is known to the present inventors, required to be constructed using customized, "hard wired" circuit cards or boards to which are mounted individual electronic components or circuits.

It may, of course, be feasible in some instances for a switched-output controller manufacturer to vary some simple output timing functions in a particular type of switched-output controller to meet different user requirements simply by changing the resistance or capacitance in one or more R-C timing circuits in the controllers. However, more varied customer requirements usually require the redesign of major portions of the switched-output controller, with the consequent necessity for the laying out and fabricating of entirely different circuit boards or cards for most customers having substantially different switched-output controller input/out requirements.

This requirement for redesign and manufacture of switched-output controllers for many different functional control requirements (i.e., operational protocols) of customers usually results in undesirably high unit switched-output controller costs. This is particularly the situation if individual customer controller procurements are so small that the redesign costs cannot be amortized over a large number of controllers. Moreover, even if unit cost is not a limiting factor, such switched-output controller redesign can result in the inability to meet tight customer delivery schedules.

These problems often result in customer dissatisfaction and loss of business, particularly for small switched-output controller manufacturing companies which tend to specialize in custom applications, as opposed to large manufacturers which tend to be awarded large contracts—such as government contracts—for providing a large number of the same type of switched-output controller apparatus.

For these and other reasons, the present Applicants have invented an improved, generally universal switched-output controller apparatus that incorporates a programmable microcontroller that can be configured to provide a variety of switched power and/or signal outputs which are responsive to a variety of inputs and which satisfy a variety of customer operational protocols. The present switched-output control apparatus, which may be designated a one time programmable ("OPT") switched-output controller because once programmed it cannot be reprogrammed, enables the economical customizing of a single or only a few standard types of switched-output controller apparatus according to the different operating specifications of different customers without the need for circuit redesign and the manufacture of customized circuit cards or boards.

SUMMARY OF THE INVENTION

In accordance with the present invention, there is provided a one time programmable electronic switched-output controller apparatus which comprises a plurality of output relays, which may be power relays or switching voltage relays, or relays which provide dry contact switching, or any combination thereof, for providing a plurality of switched outputs. Each of the output relays has a corresponding relay operating coil. Included is an internal power section configured for receiving AC line power and for providing at least one internal operating DC voltage and which can be connected to provide line AC power to the power relays and/or a DC voltage to the signal voltage relays, depending on the types of relays used. Correspondingly, power and/or DC voltage and/or closed contacts are provided at the switched output when the associated relay coils are actuated.

A one time programmable microcontroller installed in the apparatus is connected for receiving the at least one operating DC voltage, and has outputs connected to the relay coils. The microcontroller is pre-programmed by the manufacturer of the switched-output controller apparatus to activate (i.e., energize or de-energize) one or more of the relay coils in accordance with a preestablished protocol for operation of the output relays. Alternatively, the apparatus may be constructed so that the buyer can one time program the microcontroler to the buyer's specification.

Included in the apparatus may be a circuit connected for conditioning signals from an R232 connection and for providing the conditioned RS232 signals to the microcontroller. In such case, the microcontroller is programmed to be responsive to the reconditioned RS232 signals to activate one or more of the relay coils in accordance with the preestablished operating protocol which requires the RS232 signals for operation of the apparatus. Alternatively or in addition, the apparatus may include an internal modem connected for providing telephone-transmitted control signals to the microcontroller. The microcontroller may also be pre-programmed, as a requirement of an operating protocol, to provide output signals to the RS232 connection or a telephone line connected to the internal modem.

The microcontroller of the pre-programmed switched-output control apparatus may also, or alternatively, be connected for receiving operating signals from one or more other external sources, the microcontroller being pre-programmed to be responsive to such external operating signals to activate one or more of the relay coils in accordance with the preestablished operating protocol which requires the external operating signals for actuation of one or more of the relay coils. An external signal may correspond to a level of an external temperature being, or to be, monitored or to a level of an external pressure being, or to be, monitored.

The one time programmable switched-outlet apparatus may further include a plurality of panel lights, in which case, the microcontroller can be pre-programmed to cause the operation of the panel lights in accordance with the preestablished operating protocol as well as to cause activation of the relay coils. Preferably, each of the output relays has an associated panel light that is activated by the microcontroller when the relay coil of the associated output relay is energized.

There is provided a corresponding method for manufacturing a one time programmable switched-output controller apparatus, the method comprising the steps of connecting a plurality of switched output relays for receiving power from an AC or DC power source and for providing a plurality of controlled switched outputs when corresponding relay coils of the relays are energized or deenergized; connecting an AC to DC power supply for receiving AC voltage from the AC power source and for providing at least one DC voltage; connecting a one time programmable microcontroller for receiving the at least one operating DC voltage and for controlling the actuating of the relay coils; and programming the microcontroller so as to activate the relay coils in accordance with a preestablished protocol for operation of the switched output relay coils.

Preferably, the step of programming the microcontroller includes physically altering portions of the microcontroller before installing the microcontroller in the power control apparatus. In turn, the step of physically altering portions of the microcontroller preferably includes using a computer to determine the portions of the microcontroller to be altered.

The method may include the step of connecting a circuit for receiving and conditioning signals from an R232 connection and for providing the conditioned RS232 signals to the microcontroller, and programming the microcontroller to be responsive to the reconditioned RS232 signals for activating one or more of the relay coils in accordance with the preestablished operating protocol which requires the RS232 signals for operation of the apparatus. The programming step may include programming the microcontroller for providing outputs to the RS232 connection as required by the preestablished operating protocol.

Alternatively, or in addition, the method may include the step of connecting an internal modem for receiving operating signals over a conventional telephone line for causing operation of the microcontroller in accordance with the operating protocol. The programming step may include programming the microcontroller for providing outputs to the modem connection as required by the preestablished operating protocol.

In addition or alternatively, there may be included the step of connecting the microcontroller for receiving operating signals from an external source or sources, and programming the microcontroller to be responsive to these external operating signals for activating one or more of the relay coils in accordance with the preestablished operating protocol which requires the external operating signals for activation of one or more of the relay coils. The external signal may correspond to an external temperature level to be monitored or to an external pressure level to be monitored.

There is accordingly provided a generally universal, one time programmable, multiple switched output controller apparatus that can be easily and relatively inexpensively adapted to meet a variety of customer control requirements by an appropriate one time programming of the microcontroller by the manufacturer or a buyer before the microcontroller is installed in the power control apparatus.

BRIEF DESCRIPTION OF THE DRAWINGS

The present invention can be more readily understood by a consideration of the following detailed description when taken in conjunction with the accompanying drawings, in which:

FIGS. 2A and 2B in combination form an electrical schematic drawing of the improved switched-output controller apparatus of FIG. 1 showing a preferred manner of implementing the switched-output controller; FIG. 2A showing power input and switched output relay portions of the apparatus and FIG. 2B showing control input and control output portions of the switched-output controller apparatus;

Unless otherwise specifically stated, in the various Figures identical elements and features are given the same reference number.

DETAILED DESCRIPTION OF THE INVENTION

Figure 1:
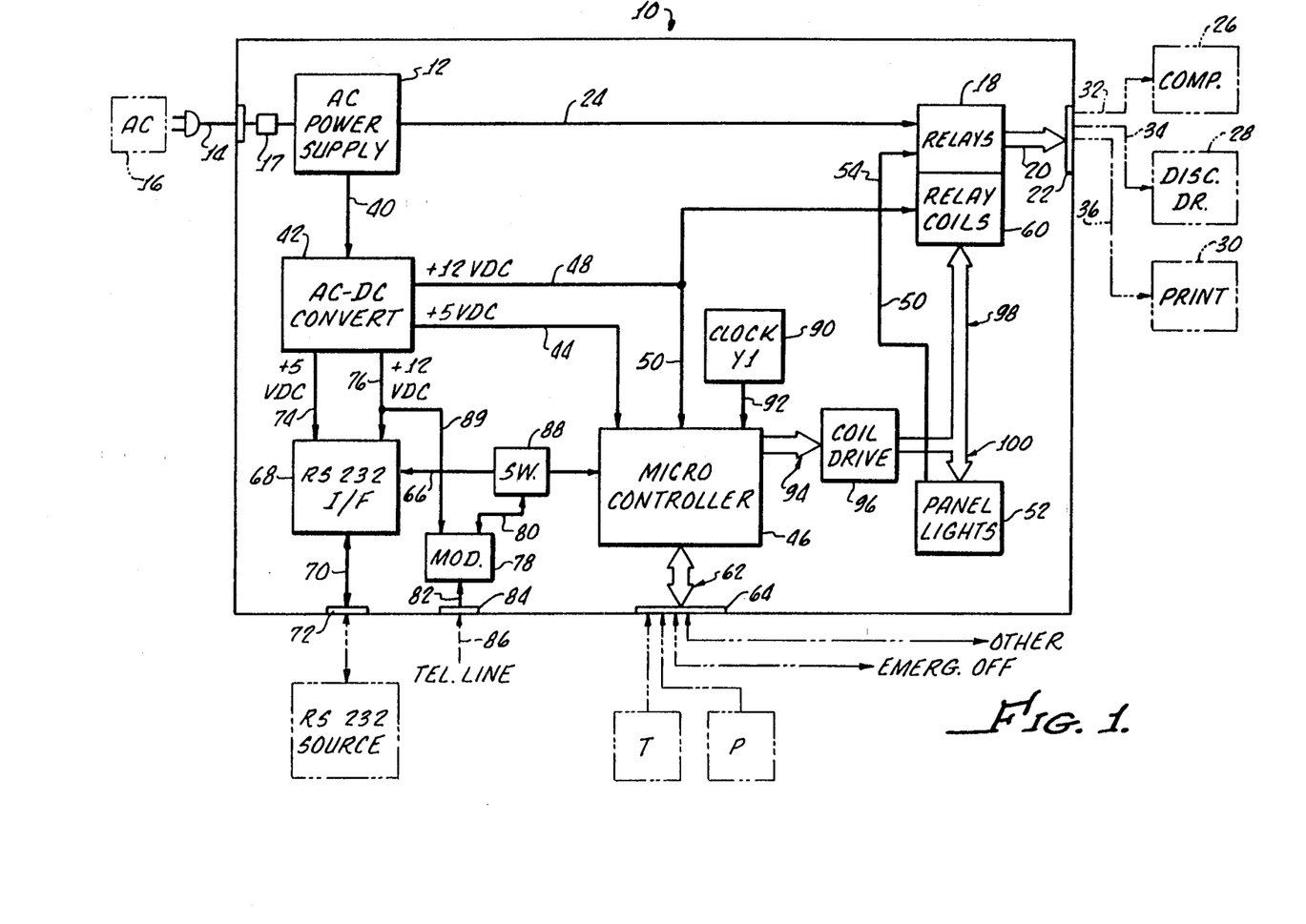
FIG. 1 is a block diagram of the improved universal, one time programmable multiple switched-output controller in accordance with the present invention, showing in functional block form the various internal functions of the apparatus, and showing various representative inputs and outputs of the apparatus.

There is depicted in FIG. 1, in a simplified functional block diagram form, a one time programmable ("OTP") multiple switched-output controller apparatus 10 in accordance with the present invention. Included in OTP switched-output controller apparatus 10 is an internal AC power supply 12 that is connected, by a power conduit 14 for receiving AC line voltage and power from an existing power source 16, for example, a building outlet (shown in phantom lines). Source 16 may provide 115 volts AC or 220 volts AC. An "on-off" power switch 17 is connected in series in power conduit 14 for turning apparatus 10 on and off.

Included in OTP switched-output controller apparatus 10 is a plurality of relays 18 which may comprise power relays, DC low level voltage relays, dry contact switching relays (which just provide open and closed switching for external circuits) or a combination thereof according to specific switching output requirements. The outputs of relays 18 are provided over a plurality of conduits 20 to an output connection block 22.

Assuming, by way of illustration, with no limitation intended or implied, that relays 18 include one or more power relays, AC power supply 12 is then connected for feeding AC line voltage, over an electrical conduit 24 to such relays which are, in turn, connected over one or more conduits 20 to block 22. By way of illustrative example, an external computer 26, an external disc drive 28 and an external printer 30 (shown in phantom lines) are plugged into, by respective power cords 32, 34 and 36, to power block 22 for receiving power from actuated power relays comprising relays 18 in accordance with a preestablished operating protocol.

AC power supply 12 also provides line voltage, over an electrical conduit 40, to an AC to DC (A to D) voltage converter 42 which provides both +5 volts DC and +12 volts DC outputs. The +5 volts DC is fed over an electrical conduit 44 to an OTP microcontroller 46 and the +12 volts DC is fed, over electrical conduits 48 and 50, to the microcontroller and over conduits 48 and 50 to panel lights 52. Assuming that one or more of relays 18 is a DC voltage switching relay, +12 volts DC is provided to such relays over a conduit 54.

As more particularly described below, OTP microcontroller 46 controls the operation of power relays 18 in accordance with whatever preestablished operating protocol apparatus 10 is configured to perform. As shown, A to D converter 42 also provides +12 volts DC, over conduit 48 to relay coils 60 which form the controlling part of relays 18.

OTP microcontroller 46 is connected through a plurality of electrical conduits 62 to an input signal block 64 to which various input voltage signal sources, including an emergency off ("EMO") and others such as may, for example, be provided by external temperature and pressure monitoring devices (not shown), assuming that the particular operation protocol requires input from such external sources.

OTP microcontroller 46 is also connected through an electrical conduit 66 to an RS232 interface circuit 68 which is, in turn, connected through an electrical conduit 70 to an RS232 connector 72. A to D converter 42 provides +5 volts DC and +12 volts DC, over respective conduits 74 and 76, to RS232 interface 68 for the operation thereof.

In addition, or as an alternative, to RS232 interface, there may be provided an internal modem 78 which is connected by an electrical line 80 to conduit 66. An electrical conduit 82 is connected between modem 78 and a telephone lack 84 to which is shown connected a telephone line 86. A relay 88 is provided in conduit 66 to switch between RS232 interface 68 and modem 78. An electrical conduit 89 is connected for providing +12 volts DC to modem 78.

A high frequency crystal timer or clock 90 (Y1) provides clock timing pulses to microcontroller 46 over a conduit 92.

DC voltage control signals are provided by OTP microcontroller 46, over a plurality of output signal lines 94 to a relay driver 96, which, in turn, provides relay coil driving signals to relay coils 60 over a plurality of driving lines 98. If desired, and as shown by way of an illustrative example, driving signals from relay driver 96 may be provided over lines 100 to panel lights 52.

OTP Microprocessor 46 (which preferably comprises either a Motorola series M68HC05, an SGS-Thompson series ST62XX or a Microchip series Pic 16C5X programmable chip in a dual in-line package) controls the activation (i.e., the energizing and de-energizing) of relay coils 60 which operate corresponding ones of relays 18 in accordance with instructions set forth in the particular operating protocol being implemented. Such operating instructions for microprocessor 46 are permanently incorporated into (i.e., burned into) the microcontroller integrated circuit by the controller manufacturer before the microprocessor is installed in the main control circuit board in the manner set forth below.

OTP microcontroller 46 can be programmed so as to control any or all of relays 18 without requiring any external signals, for example, on RS232 and/or modem conduit 66 or any signals on conduits 62. On the other hand, microcontroller 46 can be programmed to be responsive to any of such external signals, for example, signals on conduit 62 indicating a high or low external temperature being monitored or a signal incoming on RS232 conduit 66 indicating that one external computer is requesting that another external computer controlled by apparatus 10 (such as computer 26) to be turned on or off.

Figure 2A:
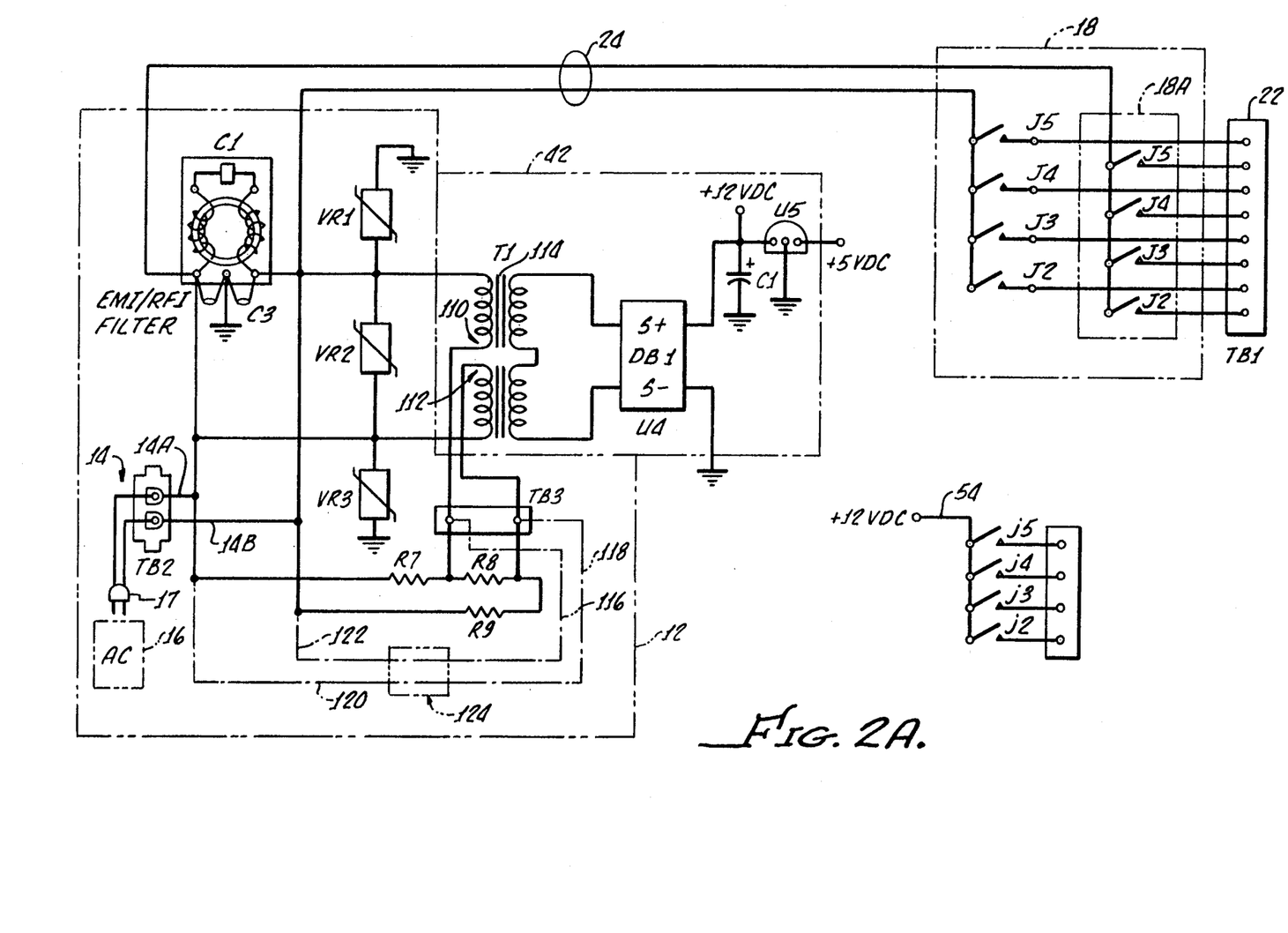
Figure 2B:
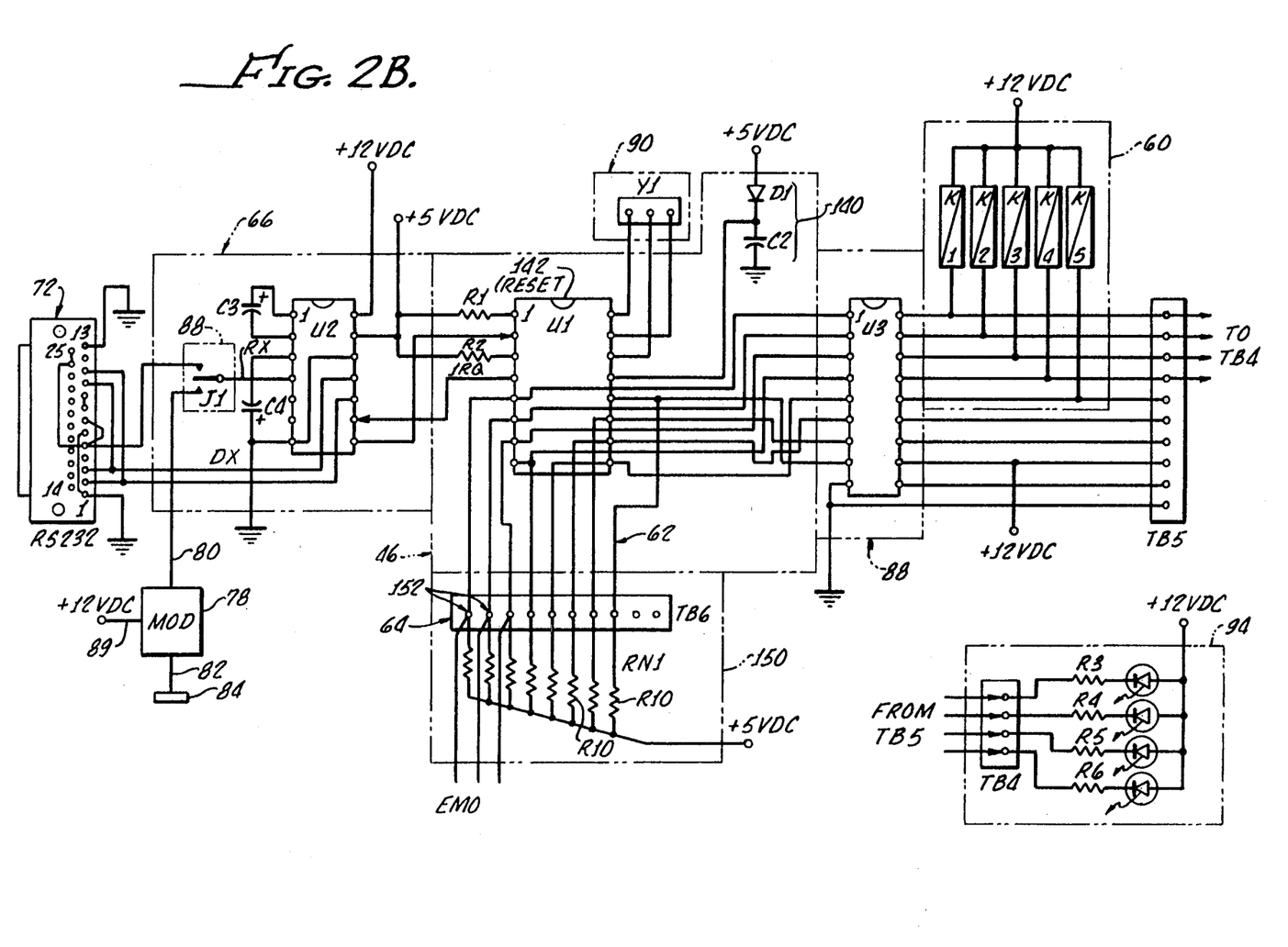

Implementation of FIGS. 2A and 2B

One time programmable switched-output controller apparatus 10 of FIG. 1 can be constructed in a number of ways, as is well known to those skilled in the electronics arts. However, FIGS. 2A and 2B in combination form an electronic circuit schematic diagram that is illustrative of one such way that has been determined by the present inventors to be advantageous from flexibility and manufacturing points of view.

It will be readily apparent from the FIG. 2 circuit schematic diagram, together with the component table set forth below, to those skilled in the art how switched-output controller apparatus can be constructed; consequently no lengthy detailed description of the circuit schematic diagram is considered necessary. Instead, the description of FIGS. 2A and 2B will be limited to certain features of apparatus 10, as depicted in FIG. 2, that are considered by the present inventors to be particularly advantageous.

First, it can be seen from FIG. 2A that, by way of illustration, four relays, J2 through J5, of the power type comprise relays 18, thereby providing four switched power outputs at connector 22. Preferably, and as depicted, relays J2 through J5 are double pole, single throw (DPST) relays and, as such, have two sets of relay contacts designated as J2-J5 and J2'-J5'. For use with a voltage source 16, only one set of relay contacts, those indicated as J2-J5, are connected, through conduit to AC power source 12. However, when AC power source is connected for providing 220 volts AC, the second set of relay contacts J2'-J5' (designated as 18A) are necessarily also connected so as to provide switched 220 volts AC at connector 22.

TABLE

| | |
|---|---|
| U1 | (see below) |
| U2 | Maxim P/N MAX 232 |
| U3 | SGS-Thompson P/N L603 |
| U4 | 4 Amp Diode Bridge |
| U5 | +5 Volt Regulator |
| K1-K5 | OMORON Relay P/N G2R-2214 |
| Y1 | 4 Mhz Ceramic Resonator |
| C1 | 1000 microfarad |
| C2 | 1.2 farad Gold Cap. |
| C3 | 0.1 Microfarad |
| C4 | 0.1 Microfarad |
| R1-R2 | 5K Ohm |
| R3-R6 | 10K Ohm |
| R7-R9 | 0 Ohm (Jumpers) |
| R10 | 10K Ohm |

It is, of course to be understood that although relays 18 may comprise all AC power relays such as just described above and identified by part number in the TABLE (and are not limited to four relays, but can be of a greater or lesser number), or may comprise all DC signal voltage relays J2 through J5 which are connected by conduit 54 to A-D converter to receive a DC voltage therefrom, as is also depicted in FIG. 2A.

As another option, relays 18 may consist entirely of contact closure relays, similar to relays J2-J5 but without DC voltage applied thereto, such contact closure relays acting simply as "dry" contact closures (switches), as may be required under certain operating protocols. Alternatively, relays 18 may consist of any combination of AC power relays, DC voltage signal relays and simple contact closure relays, according to customer operation protocol requirements. In practice, a single printed circuit card may have locations for a certain number of relays, and any type of relay may be installed in any of the locations, the only requirement being that the appropriate input (e.g., AC power over conduit 24 or DC voltage over conduit 54) to the relays be provided.

It was mentioned above that relay contacts J2'-J5' are used when the AC line voltage is 220 volts AC. Power source 12 is preferably constructed so that it can receive, over conduit 14 (FIG. 1), either 115 or 220 volts AC from source 16. As shown, resistors R7, R8, and R9 that are shown for illustrative purposes as being connected between input center taps 110 and 112 of transformer coil 114 and conduits 14A and 14B of conduit 14 are zero ohms, that is, they function merely as jumpers. Not all three such resistors R7, R8 and R9 are used at the same time. To provide 115 volts to transformer coil 114, resistor R8 is not installed; while to provide 220 volts resistors R7 and R9 are not installed.

The above-described arrangement of resistors R7-R9 is installed by the controller manufacturer according to customer requirement for 115 volts or 220 volts. However, a simple arrangement can be made to permit the customer to easily select voltage from either a 115 or a 220 volt supply. In such case, resistors R7-R9 are omitted and conduits 116, 118, 120 and 122 are connected to a slide-type selector switch 124 that is accessible to the user. Conduits 116 and 118 are connected, respectively, to transformer center taps 110 and 112 and conduits 14A and 14B, as shown in broken lines on FIG. 2a.

There are several features of OTP switched-output controller apparatus 10 that are shown on FIG. 2B which are considered possibly to warrant some description. A diode-capacitor circuit 140, which functions as a rechargeable battery and which may referred to as a "keep alive" circuit, is connected to a OTP microcontroller integrated circuit 142 (which is above-mentioned as preferably comprising a Motorola, SGS Thompson or Microchip type of integrated circuit, is also referred to as "U1" and comprises the basic part of microcontroller 46) by a electrical conduit 144. As noted in the above TABLE, capacitor C2 of circuit 140 comprises a 1.2 farad capacitor, which is charged through diode D1 when apparatus 10 is turned on.

The function of keep alive circuit 140 and principally of capacitor C2 is to maintain any information held in volatile memory portions of integrated circuit U1 (142) when controller apparatus is turned off and circuit U1 is in a "sleep" mode. Keep alive circuit 140 protects such information from being "volatilized" (i.e., lost), typically for about three to about six months in circuit U1's sleep mode. Circuit 140 accomplishes this keep alive function and eliminates the need for any internal battery, such as would otherwise have to be provided to prevent the loss of volatile memory in circuit U1 in its sleep mode.

Another feature of switched-output controller apparatus 10 is a pull-up resistor network 150 which can be considered to form a part of connector 64 which is connected by conduit 62 to microcontroller 46 (actually to OTP microprocessor integrated circuit 142, as shown in FIG. 2B). As shown, resistor network 150 comprises a plurality of resistors, R10, one of which is connected to each input pin 152 of connector 64 and which are all connected to +5 volts DC. When a "zero" signal is provided at any connector input pin 152 (such as may be provided, for example, by the closing of an external circuit in response to some preestablished parameter, such as temperature or pressure, being exceeded), that pin goes to zero and provides a "zero" or closed signal to the corresponding input pin of circuit 142 (U1). When the "zero" signal is then removed from that connector pin 152, instead of the that pin "floating" at some indeterminate level which might adversely affect the operation of circuit 142, that pin is "pulled up" to +5 volts and held there until another "zero" signal is received.

An additional feature of OTP switched-output controller apparatus 10, as depicted in FIG. 2B, is that the connection of modem 78 and RS232 interface 68 to microcontroller 46 (i.e., to circuit U1) is controlled by a set of fifth relay contacts designated by J1. In one J5 contact position, modem 78 is connected and in the other J5 contact position RS232 interface 68 is connected. The selection of which of RS232 interface 68 and modem 78 is to be connected to circuit U1 is controlled by the programming of U1.

Another advantage of OTP switched-output controller apparatus 10 is that because of an "on-board" clock in microcontroller 142, it can be programmed so that if no commands are received (for example, from RS232 interface 68 of modem 78) within a preestablished (i.e., a programmed) time period, apparatus 10 or any of the outputs can be caused to "reboot."

Still another advantage of apparatus 10 is that microcontroller 142 can have a specific "address," and a number of apparatus 10 can be provided with microcontrollers having different addresses. When a microcontroller 142 is sent a command to set address, it takes the next "characters" and stores them in memory. Thereafter (unless the address is changed), all commands to this microcontroller must be prefaced with these characters for the commands to be "received" and acted upon. This enables, for example, more than one apparatus 10 to be on a common modem or RS232 line—each apparatus is on line and "listening" but only receives RS232 information when the address of its microcontroller 142 is correctly addressed. This addressing capability can also be used for password-type protection.

One Time Programming of Microcontroller 142 (U1):

As above described, OTP microcontroller 46 (specifically circuit 142 thereof) is one time programmable; when so programmed it functions as a "hard-wired" circuit and, unlike software-controlled microprocessors, cannot be re-programmed. Its advantage in that regard is that such OTP microcontroller integrated circuits 142 are relatively inexpensive and do not require any programming expertise on the part of the customer of apparatus 10.

Each of the above-mentioned preferred circuits 142 (i.e., Motorola series M68HC05, SGS-Thompson series ST62XX and Microchip series Pic 16C5X-) has a programming instruction manual written by the manufacturer as well as an associated computer programming disc. For example, Motorola provides a manual identified as "M68HC05 Applications Guide," SGS-Thompson provides a manual identified as "ST6210/ST62215, ST6220/ST6225 Databook," and Microchip provides a manual identified as "Embedded Control Handbook." All of such manuals are available directly from the cited manufacturers and/or from many electronic suppliers, such as Marshall, One Morgan, Irvine, Calif. 92718 and Arrow Electronics, Inc., 6 Cromwell Street, Suite 100, Irvine, Calif. 92718.

In addition, the OTP microcontroller manufacturers ordinarily have available for sale program boards which are connectable to a computer and into which their OTP circuits can be plugged for programming before installation in controller apparatus 10.

Figure 3:
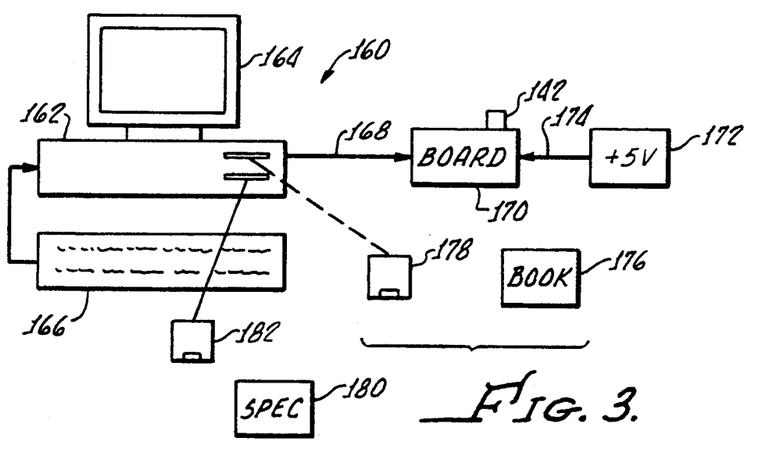
FIG. 3 is a pictorial diagram, in functional block diagram form, depicting the manner in which the one time programmable microcontroler of the switched-output controller apparatus is programmed to provide a switched-output in conformance with a preestablished operation protocol or specification.

FIG. 3 depicts, in functional block diagram form, a programming system 160 of the type used by the present inventors for programming OTP microcontroller circuits 142. As shown, programming system 160 includes a computer 162 with a monitor 164 and a keyboard 166. Connected to a serial port of computer 163, by an electrical conduit 168 is a program board 170 of the type made available by the microcontroller circuit manufacturer. For example, in the case of a Motorola series M68HC05 series microcontroller 142 (i.e., U1), program board 170 comprises an M68HC705KICS board. Shown plugged into program board 170 is an OTP microcontroller 142, which in the case of a Motorola program board 170 would be the above-cited Motorola series circuit.

A +5 volt DC power supply 172 is connected for providing voltage to program board 170 through a conduit 174. An associated manual 176, in this example, Motorola M68HC05 Applications Guide, and a related Motorola program disc 178 are considered as part of system 160. With the aid of instructions provided in manual 176 and of related disc 178, taken in conjunction with a customer's operation protocol or specification 180, an operator prepares a special programming disc 182. With disc 182 in computer 162 and with a circuit 142 plugged into program board 170, the operator "blows" specific connections and/or devices in the circuit to program the circuit to operate apparatus 10 in accordance with operating protocol 180.

The present inventors consider that anyone having ordinary skill in the computer programming art can, with the assistance of the microprocessor manufacturer's instruction manual, program OTP microcontroller 142 to perform in accordance with a customer's or user's apparatus operating protocol.

EXAMPLE

Figure 4:
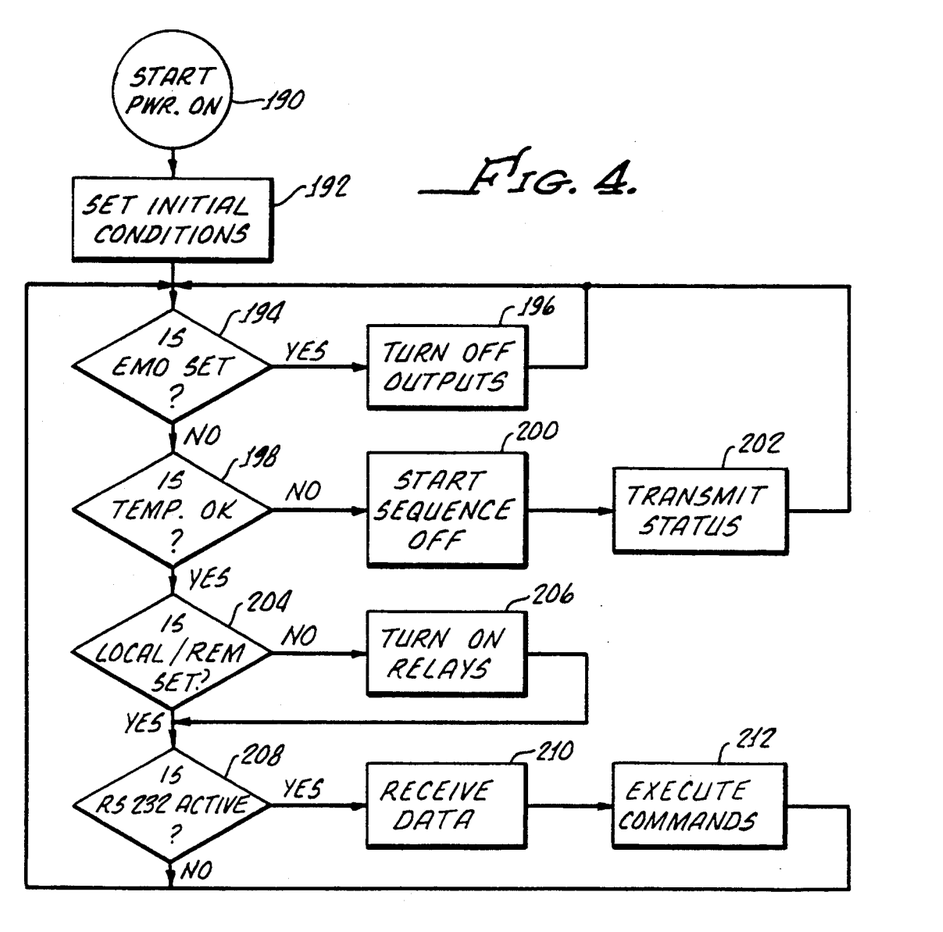
FIG. 4 is a flow diagram showing, by way of example, a representative operation protocol for a switched-output controller apparatus of the type depicted in FIGS. 1 and 2, the output characteristics of the depicted apparatus being responsive to an input signal an RS232 input.

FIG. 4 is an exemplary flow diagram or algorithm showing the manner in which a microcontroller 142 would be functionally programmed to control switched outputs in response to signals from an RS232 line and from external Emergency Off ("EMO") and temperature signals. Similar diagrams are included in the microcontroller manufacturer's manuals to assist a programmer in programming a microcontroller circuit 142 in an appropriate manner to cause apparatus 10 to perform in accordance with the preestablished operating protocol.

The following reference numbers correspond to the various decision boxes on the flow diagram of FIG. 4: "START PWR. ON" reference number 190; "SET INITIAL CONDITIONS" reference number 192; "IS EMO SET?" reference number 194; "TURN OFF OUTPUTS" reference number 196; "IS TEMP. OK?" reference number 198; "START SEQUENCE OFF" reference number 200; "TRANSMIT STATUS" reference number 202; "IS LOCAL/REM SET?" reference number 204; "TURN ON RELAYS" reference number 206; "IS RS232 ACTIVE?" reference number 208; "RECEIVE DATA" reference number 210; and "EXECUTE COMMANDS" reference number 212. As shown in FIG. 4, after "START POWER ON" (190) and "SET INITIAL CONDITIONS" (192), a sequence of questions are examined: "IS EMO SET?" (194), "IS TEMP. OK?" (198), "IS LOCAL/REM SET?" (204), and "IS RS232 ACTIVE?" (208).

AS shown in FIG. 4, after the decision is to "START, PWR. ON" (190), initial conditions are set by "SET INITIAL CONDITIONS" (192). Next, the condition of the EMO (emergency off) is addressed by "IS EMO SET?" (194). If the answer is "yes," the decision is to "TURN OFF OUTPUTS" (196) and the decision tree returns to "IS EMO SET?" (194); if the answer is "no,", the next system condition question is addressed by "IS TEMP, OK?" (198). If the answer is "no," the decision is to stop the sequence by "START SEQUENCE OFF" (200) and the status is transmitted back to the start by "TRANSMIT STATUS" (202); if the answer is "yes," the next system condition question is addressed by "IS LOCAL/REM SET?" (204) If the answer is "no," the decision is to "TURN ON RELAYS" (206) and proceed to the next system question "IS RS232 ACTIVE?" (208): if the answer is "yes," the next system question addressed by "IS RS232 ACTIVE?" (208). If the answer is "yes," the next command is "RECEIVE DATA" (210) from the RS232 line (reference number 70, FIG. 1) and the next instruction is to "EXECUTE COMMANDS" (212), would execute commands provided over the RS232 line. Then, or if the answer is "no," the operation is looped back to the "SET INITIAL CONDITIONS" (192).

Within a wide range of operating limits of apparatus 10, microcontroller circuit 142 can be one time programmed to meet the different operating requirements of different customers.

There has been described above OTP switched-output controller apparatus 10; the corresponding method of manufacturing such an apparatus is apparent. Basically, the method comprises assembling the various parts of the apparatus and one time programming the micocontroller integrated circuit 142 in accordance with a customer's or intended user's operating protocol so that the apparatus operates according to the protocol.

Although there has been described and illustrated an improved, generally universal, manufacturer-programmable switched-output controller apparatus in accordance with the present invention for purposes of illustrating the manner in which the invention may be used to advantage, it is to be appreciated that the invention is not limited thereto. For example, apparatus 10 could be supplied to a customer or user with an uninstalled OTP microcontroller circuit 142 so that the customer or user can program the microcontroller itself. Therefore, any and all variations and modifications that may occur to those skilled in the electronic and power controller arts are to be considered as being within the scope and spirit of the claims as appended hereto.

What is claimed is:

1. A one time programmable switched-output controller apparatus which comprises:
   a. a plurality of relays for providing a plurality of controlled switched outputs, said relays being selected from the group consisting of power relays, signal switching relays, dry contact closing relays and combinations thereof, each of said relays having a corresponding relay operating coil;
   b. a power section configured for receiving AC line power and for providing internal operating DC voltage and connected for providing line AC power to any power relays and thereby to corresponding outputs when the corresponding power relay coils are actuated, and for providing DC voltage to any signal switching relays and thereby to corresponding outputs when the corresponding switching signal relay coils are activated; and
   c. a microcontroller connected for receiving said at least one operating DC voltage and having outputs connected to said relay coils, said microcontroller containing a one time programmable memory which is programmed to perform the specific tasks of actuating one or more of said relay coils in accordance with a preestablished protocol for operation of said relays.

2. The one time programmable switched-output controller apparatus as claimed in claim 1, including:
   a. a circuit connected for conditioning signals from an RS232 connection and for providing said conditioned RS232 signals to said microcontroller;
   b. a modem connected for providing telephone line transmitted signals to said microcontroller; and
   c. a microcontroller-controlled switch connected for enabling either the RS232 conditioned signals or said telephone line transmitted signals to be received by the microcontroller.

3. The one time programmable switched-output controller apparatus as claimed in claim 1, including a circuit connected for conditioning signals from an RS232 connection and for providing said conditioned RS232 signals to said microcontroller, the microcontroller being one time programmed to be responsive to said reconditioned RS232 signals to activate one or more of said relay coils in accordance with said preestablished operating protocol which requires said RS232 signals for operation of the apparatus.

4. The one time programmable switched-output controller apparatus as claimed in claim 1, wherein said microcontroller is connected for receiving operating signals from an external source, the microcontroller being programmed to be responsive to said external operating signals to activate one or more of said relay coils in accordance with said preestablished operating protocol which requires said external operating signals for actuation of one or more of said relay coils.

5. The programmable electronic power controller apparatus as claimed in claim 1, including a modem connected for providing telephone line transmitted signals to said microcontroller, the microcontroller being one time programmed to be responsive to said telephone line transmitted signals to activate one or more of said relay coils in accordance with said preestablished operating protocol which requires said telephone line transmitted signals for operation of the apparatus.

6. The one time programmable switched-output controller apparatus as claimed in claim 5, wherein said microcontroller is programmed as a requirement of said preestablished operating protocol to provide output signals to the modem for transmitting over a telephone line.

7. The one time programmable switched-output controller apparatus as claimed in claim 1, including a plurality of panel lights and wherein said microcontroller is programmed to cause the operation of said panel lights in accordance with said preestablished operating protocol as well as to cause activation of said relay coils.

8. The one time programmable switched-output controller apparatus as claimed in claim 7, wherein each of said relays has an associated panel light that is activated by said microcontroller when the relay coil of the associated relay is activated.

9. The one time programmable switched-output controller apparatus as claimed in claim 2, wherein said microcontroller is programmed as a requirement of said preestablished operating protocol to provide output signals to the RS232 connection.

10. The one time programmable switched-output controller apparatus as claimed in claim 9, wherein said external signal corresponds to a level of an external temperature to be monitored.

11. The one time programmable switched-output controller apparatus as claimed in claim 9, wherein said external signal corresponds to a level of an external pressure to be monitored.

12. A method for constructing a one time programmable switched-output controller apparatus, said method comprising the steps of:
 a. connecting a power supply for receiving AC line power from an external source and for providing a DC voltage therefrom;
 b. selecting a plurality of output relays consisting of power relays, signal switching relays, dry contact closing relays or combinations thereof;
 c. connecting any of said selected power relays to said power supply for receiving AC line power therefrom and for providing said AC line power to corresponding outlets when said power relays are activated;
 d. connecting any of said selected signal switching relays to said power supply for receiving DC voltage therefrom and for providing said DC voltage to corresponding outlets when said signal switching relays are activated;
 e. connecting a microcontroller, which contains a one time programmable memory, for receiving said at least one operating DC voltage and for controlling the actuating of relay coil associated with said selected relays; and
 f. programming said one time programmable memory to perform the specific task of actuating selected ones of said relay coils in accordance with a preestablished protocol for operation of said relay coils.

13. The method for constructing a one time programmable switched-output controller apparatus as claimed in claim 12, including the step of connecting a circuit for receiving and conditioning signals from an R232 connection and for providing said conditioned RS232 signals to said microcontroller, and programming the microcontroller to be responsive to said reconditioned RS232 signals for activating one or more of said relay coils in accordance with said preestablished operating protocol which requires said RS232 signals to enable actuation of one or more of said relay coils.

14. The method for constructing a one time programmable switched-output controller apparatus as claimed in claim 12, including the step of connecting a modem for receiving telephone line transmitted signals to said microcontroller, and programming the microcontroller to be responsive to said telephone line transmitted signals for activating one or more of said relay coils in accordance with said preestablished operating protocol which requires said telephone line transmitted signals to enable actuation of one or more of said relay coils.

15. The method for constructing a one time programmable switched-output controller apparatus as claimed in claim 12, including the step of connecting a plurality of panel lights to said microcontroller and programming the microcontroller so that whenever one of the relay coils is activated by the microcontroller a corresponding one of the panel lights is activated.

16. The method for constructing a one time programmable switched-output controller apparatus as claimed in claim 12, wherein the step of one time programming said microcontroller includes physically altering portions of said microcontroller before installing the microcontroller in the switched-output controller apparatus.

17. The method for constructing a one time programmable switched-output controller apparatus as claimed in claim 16, wherein the step of physically altering portions of said microcontroller includes using a computer to determine the portions of said microcontroller to be altered.

18. The method for constructing a one time programmable switched-output controller apparatus as claimed in claim 12, including connecting the microcontroller for receiving operating signals from an external source, and programming the microcontroller to be responsive to said external operating signals for activating one or more of said relay coils in accordance with said preestablished operating protocol which requires said external operating signals to enable actuation of one or more of said relay coils.

19. The method for constructing a one time programmable switched-output controller apparatus as claimed in claim 18, wherein said external signal corresponds to an external temperature level being monitored.

20. The method for constructing a one time programmable switched-output controller apparatus as claimed in claim 18, wherein said external signal corresponds to an external pressure level being monitored.

* * * * *